United States Patent
Chang et al.

(10) Patent No.: US 9,533,545 B2
(45) Date of Patent: Jan. 3, 2017

(54) THERMAL MANAGEMENT SYSTEM FOR AN ELECTRIC VEHICLE

(71) Applicant: Automotive Research & Testing Center, Lugong (Changhua County) (TW)

(72) Inventors: Liang-Cheng Chang, Lugong (TW); Hong-Chi Wang, Lugong (TW); Chih-Jung Yeh, Lugong (TW); Shih-Jung Ho, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 588 days.

(21) Appl. No.: 14/141,585

(22) Filed: Dec. 27, 2013

(65) Prior Publication Data
US 2015/0121922 A1    May 7, 2015

(30) Foreign Application Priority Data
Nov. 6, 2013 (TW) .............................. 102140281 A

(51) Int. Cl.
| | |
|---|---|
| B60H 1/00 | (2006.01) |
| B60H 1/08 | (2006.01) |
| B60H 1/32 | (2006.01) |
| F25B 49/02 | (2006.01) |
| F25B 13/00 | (2006.01) |
| F25B 25/00 | (2006.01) |

(52) U.S. Cl.
CPC ...... *B60H 1/00392* (2013.01); *B60H 1/00907* (2013.01); *B60H 1/08* (2013.01); *B60H 1/3213* (2013.01); *F25B 49/02* (2013.01); *F25B 13/00* (2013.01); *F25B 25/005* (2013.01); *F25B 2313/003* (2013.01); *F25B 2313/0234* (2013.01); *F25B 2600/13* (2013.01)

(58) Field of Classification Search
CPC ... B60H 1/00392; B60H 1/00907; B60H 1/08; B60H 1/3213; F25B 49/02; F25B 13/00; F25B 25/005; F25B 2313/003; F25B 2600/13
See application file for complete search history.

(56) References Cited

U.S. PATENT DOCUMENTS

| | | | |
|---|---|---|---|
| 7,789,176 B2 | 9/2010 | Zhou | |
| 8,448,460 B2 * | 5/2013 | Dogariu | B60H 1/00278 62/178 |
| 2002/0040896 A1 * | 4/2002 | Ap | B60K 1/04 219/208 |
| 2012/0222441 A1 * | 9/2012 | Sawada | B60H 1/00392 62/238.1 |
| 2012/0240604 A1 | 9/2012 | Choi | |

* cited by examiner

*Primary Examiner* — Marc Norman
(74) *Attorney, Agent, or Firm* — Abelman, Frayne & Schwab

(57) ABSTRACT

An electric vehicle thermal management system includes a dynamic heat dissipating unit, an air conditioner unit, a heat exchange unit, and a control unit. The heat exchange unit is connected to the dynamic heat dissipating unit and the air conditioner unit for transferring heat therebetween. The control unit adjusts the flow rate of a coolant in the dynamic heat dissipating unit for controlling and adjusting the heat dissipating ability of the dynamic heat dissipating unit to meet the heat dissipation of the system, thereby improving distribution and management of heat energy in the system.

11 Claims, 14 Drawing Sheets

THERMAL MANAGEMENT SYSTEM FOR AN ELECTRIC VEHICLE

CROSS-REFERENCE TO RELATED APPLICATION

This application claims priority of Taiwanese Application No. 102140281, filed on Nov. 6, 2013.

BACKGROUND OF THE INVENTION

1. Field of the Invention

This invention relates to a thermal management system, and more particularly to a thermal management system for an electric vehicle.

2. Description of the Related Art

Heat energy of an electric vehicle needs to be managed to avoid heat accumulation which easily causes damage to the components of the vehicle due to overheat, and to transfer heat of an air conditioner installed within the vehicle. Hence, it is desirable to distribute and manage effectively heat energy during running of an electric vehicle.

SUMMARY OF THE INVENTION

The object of this invention is to provide an electric vehicle thermal management system that can improve heat distribution and management.

According to this invention, an electric vehicle thermal management system includes a dynamic heat dissipating unit, an air conditioner unit, a heat exchange unit, and a control unit.

The dynamic heat dissipating unit includes a coolant circulation pipeline adapted for permitting a coolant to flow and circulate therein along a coolant circulation direction, a main heat dissipating device connected to the coolant circulation pipeline, a liquid pump connected to the coolant circulation pipeline and disposed downstream of the main heat dissipating device along the coolant circulation direction, and a dynamic device connected to the coolant circulation pipeline and disposed downstream of the liquid pump along the coolant circulation direction. The main heat dissipating device is adapted for dissipating heat from the coolant flowing therethrough. The liquid pump controls a flow rate of the coolant flowing therethrough. The dynamic device is adapted to generate a power and heat.

The air conditioner unit is convertible between a cooling mode and a heating mode, and includes a refrigerant circulation pipeline adapted for permitting a refrigerant to circulate therein in a selected one of a cooling circulation direction and a heating circulation direction that are opposite to each other, a vehicle external heat exchanging device connected to the refrigerant circulation pipeline, an expansion valve connected to the refrigerant circulation pipeline and disposed downstream of the vehicle external heat exchanging device along the cooling circulation direction, a vehicle evaporator connected to the refrigerant circulation pipeline and disposed downstream of the expansion valve along the cooling circulation direction, and a compressor device connected to the refrigerant circulation pipeline and disposed downstream of the vehicle evaporator. The refrigerant circulates along the cooling circulation direction during the cooling mode of the air conditioner unit, and along the heating circulation direction during the heating mode of the air conditioner unit.

The heat exchange unit is connected to the coolant circulation pipeline and the refrigerant circulation pipeline, and is disposed in a coolant inlet of the main heat dissipating device of the dynamic heat dissipating unit and a refrigerant circulation outlet of the compressor of the air conditioner unit such that, during the cooling mode of the air conditioner unit, heat is transmitted from the air conditioner unit to the dynamic heat dissipating unit, and is dissipated through the main heat dissipating device.

The control unit is electrically connected to the liquid pump, and emits a control signal to the liquid pump. The liquid pump is operable to adjust the flow rate of the coolant flowing therethrough in accordance with the control signal.

As such, heat can be transferred between the dynamic heat dissipating unit and the air conditioner unit through the heat exchange unit, and the flow rate of the coolant can be adjusted under control of the control unit, so as to control heat transfer in the system, thereby improving heat distribution and management in the system.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
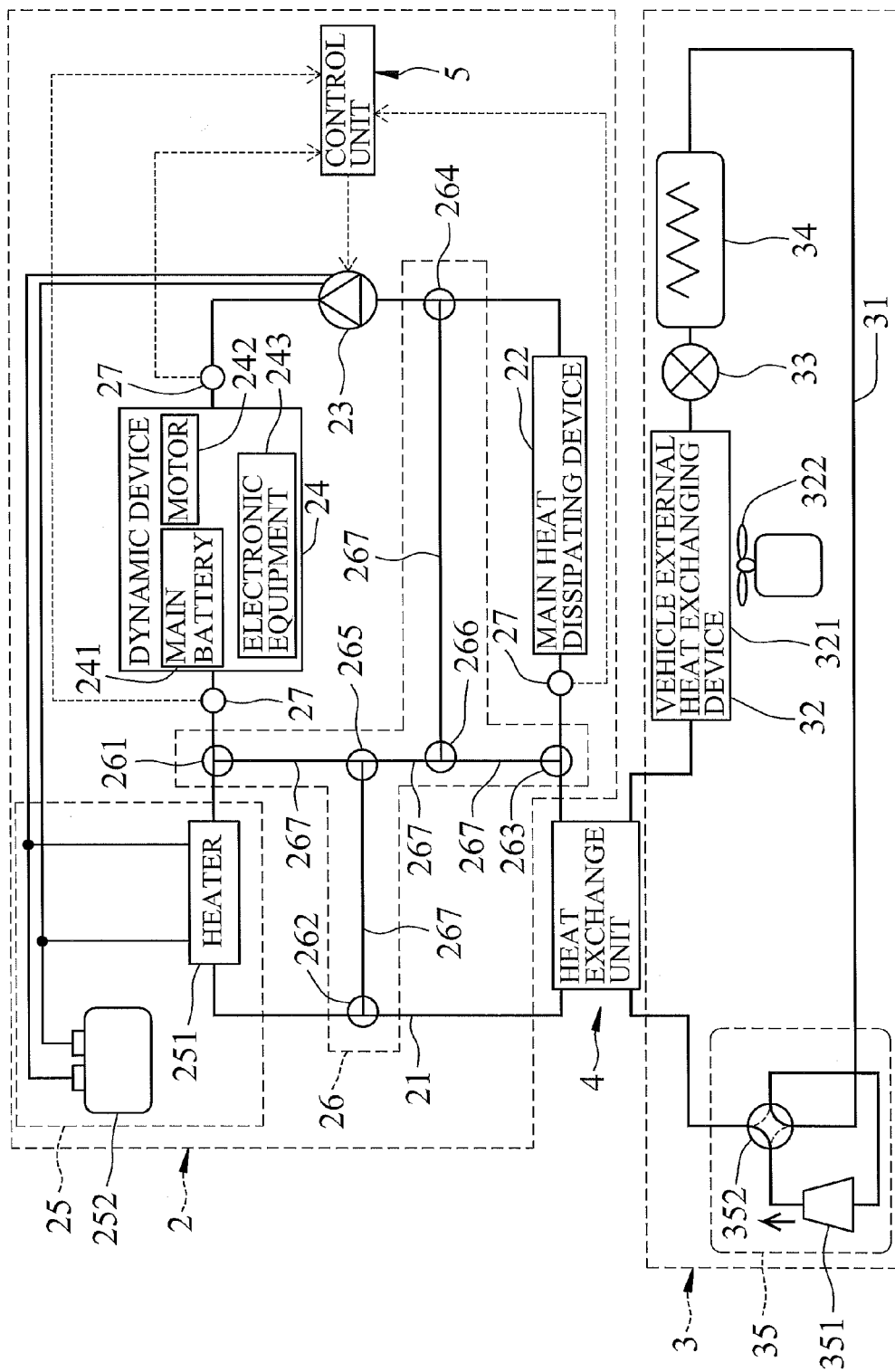
FIG. 1 is a schematic diagram of the first preferred embodiment of a thermal management system for an electric vehicle according to this invention.

Before the present invention is described in greater detail in connection with the preferred embodiments, it should be noted that similar elements and structures are designated by like reference numerals throughout the entire disclosure.

Referring to FIG. 1, the first thermal management system for an electric vehicle according to this invention includes a dynamic heat dissipating unit 2, an air conditioner unit 3, a heat exchange unit 4, and a control unit 5.

The dynamic heat dissipating unit 2 includes a dynamic coolant circulation pipeline 21 permitting flow of a coolant therein, a main heat dissipating device 22 connected to the dynamic coolant circulation pipeline 21, a liquid pump 23, a dynamic device 24, an auxiliary heating device 25, an auxiliary circulation device 26, and three temperature sensors 27 connected to the control unit 5.

The main heat dissipating device 22 is disposed for dissipating heat from the coolant. The liquid pump 23 is disposed for controlling the flow rate of the coolant. The dynamic device 24 is disposed for producing power and heat energy.

In this embodiment, the dynamic device 24 includes a main battery 241, a motor 242, and a plurality of electronic equipments 243 (only one is shown in FIG. 1).

The auxiliary heating device 25 includes a heater 251 connected to the dynamic coolant circulation pipeline 21 and located between the heat exchange unit 4 and the dynamic device 24, and a spare battery 252 electrically connected to the heater 251 and the liquid pump 23.

The auxiliary circulation device 26 is in fluid communication with a juncture between the dynamic device 24 and the heater 251, a juncture between the heater 251 and the heat exchange unit 4, a juncture between the heat exchange unit 4 and the main heat dissipating device 22, and a juncture between the main heat dissipating device 22 and the liquid pump 23. The auxiliary circulation device 26 is operable to change the circulation path of the coolant so as to switch the dynamic heat dissipating unit 2 among five operating modes including a dynamic heat dissipating mode, a heat dissipation assisting mode, a start activation mode, a dual heating mode, and a heat recovering mode.

The auxiliary circulation device 26 is connected to the dynamic coolant circulation pipeline 21, and includes a first main three-way valve 261, a second main three-way valve 262, a third main three-way valve 263, and a fourth main three-way valve 264. The first main three-way valve 261 is disposed between the dynamic device 24 and the heater 251. The second main three-way valve 263 is disposed between the heater 251 and the heat exchange unit 4. The third main three-way valve 263 is disposed between the heat exchange unit 4 and the main heat dissipating device 22. The fourth main three-way valve 264 is disposed between the main heat dissipating device 22 and the liquid pump 23.

The auxiliary circulation device 26 further includes a first auxiliary three-way valve 265, a second auxiliary three-way valve 266, and five auxiliary pipes 267. The first auxiliary three-way valve 265 is in fluid communication with the first main three-way valve 261 and the second three-way valve 262 via two auxiliary circulation pipes 267, respectively. The second auxiliary three-way valve 266 is in fluid communication with the first auxiliary three-way valve 265, the third main three-way valve 263, and the fourth main three-way valve 264 via the remaining three auxiliary circulation pipes 267, respectively.

The temperature sensors 27 are disposed for measuring respectively the temperatures of coolant inlet and outlet of the dynamic device 24 and a coolant inlet of the main heat dissipating device 22 to emit temperature signals to the control unit 5.

The air conditioner unit 3 is convertible between a cooling mode and a heating mode, and includes a refrigerant circulation pipeline 31 permitting a refrigerant to flow therein along a cooling circulation direction or a heating circulation direction, a vehicle external heat exchanging device 32 connected to the refrigerant circulation pipeline 31, an expansion valve 33, a vehicle internal heat exchanging device 34, and a compressor device 35.

In this embodiment, the vehicle external heat exchanging device 32 includes a plurality of heat dissipating fins 321 and a fan 322. The vehicle internal heat exchanging device 34 is configured as a plurality of heat dissipating fins. The compressor device 35 includes a compressor 351 and a four-way valve 352. The four-way valve 352 is operable to change a manner in which the compressor 351 and the refrigerant circular pipeline 31 are interconnected, so as to change the circulating direction of the refrigerant.

When the air conditioner unit 3 operates in the cooling mode, the refrigerant circulates along the cool air circulation direction. When the air conditioner unit 3 operates in the heating mode, the refrigerant circulates along the heating circulation direction.

The heat exchange unit 4 is connected to the dynamic coolant circulation pipeline 21 and the refrigerant circulation pipeline 31, and has three portions that are disposed respectively in the coolant inlet of the main heat dissipating device 22 of the dynamic heat dissipating unit 2, the cooling circulation direction outlet of the compressor device 35 of the air conditioner unit 3, and a heating circulation direction inlet of the compressor device 35 of the air conditioner unit 3. The heat exchange unit 4 is disposed for transmitting heat from the air conditioner unit 3 to the main heat dissipating device 22 of the dynamic heat dissipating unit 2 when in the cooling mode, and for transmitting heat from the dynamic heat dissipating unit 2 to the air conditioner unit 3 when in the heating mode.

The control unit 5 is electrically connected to the liquid pump 23, and is capable of outputting control signals. The control unit 5 receives and processes the temperature signals to obtain an estimated heat generating value and a heat dissipating ability value of the main heat dissipating device 22. When the estimated heat generating value is greater than the heat dissipating ability value, the control unit 5 emits a corresponding control signal to the liquid pump 23. Hence, the liquid pump 23 is operated to increase the flow rate until the estimated heat generating value is equal to or smaller than the heat dissipating ability value.

The five operating modes of the dynamic heat dissipating unit 2 will be described in the following.

Figure 2:
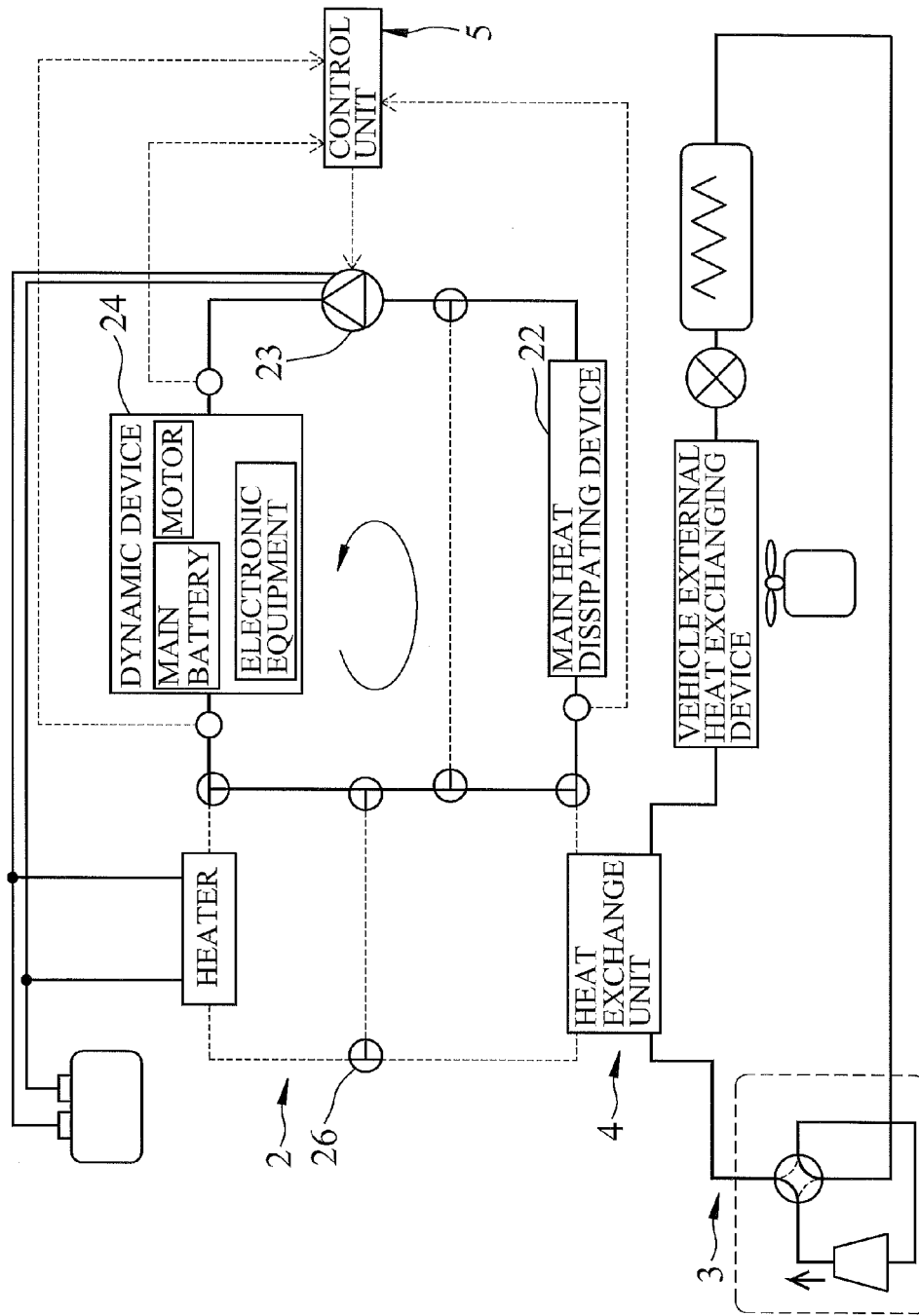
FIG. 2 is a schematic diagram of the first preferred embodiment, illustrating a dynamic heat dissipating mode of a dynamic heat dissipating unit.

1. Dynamic Heat Dissipating Mode:

Referring to FIG. 2, the air conditioner unit 3 is closed, and the dynamic heat dissipating unit 2 dissipates heat from the dynamic device 24. The auxiliary circulation device 26 is operated to allow the coolant to flow circulatively among the dynamic device 24, the main heat dissipating device 22, and the liquid pump 23.

Heat of the dynamic device 24 is dissipated by the main heat dissipating device 22.

Figure 3:
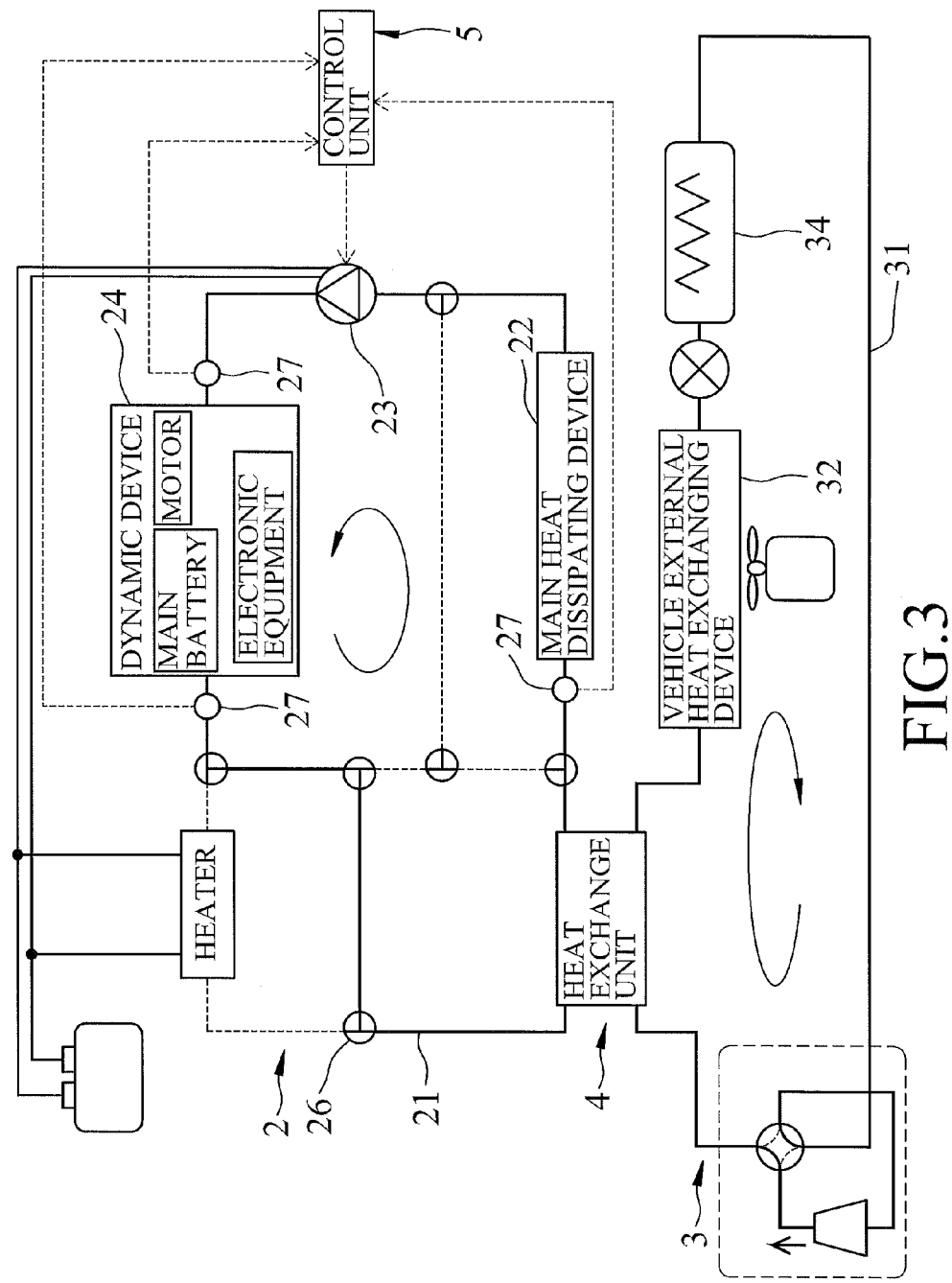
FIG. 3 is a schematic diagram of the first preferred embodiment, illustrating a heat dissipation assisting mode of the dynamic heat dissipating unit.

2. Heat Dissipation Assisting Mode:

Referring to FIG. 3, the air conditioner unit 3 is opened, and operates in the cooling mode. The dynamic heat dissipating unit 2 dissipates heat from the dynamic device 24, and facilitates heat dissipation of the air conditioner unit 3 to promote the cooling effect of the air conditioner unit 3. The auxiliary circulation device 26 is operated to allow the coolant to flow circulatively in the dynamic coolant circulation pipeline 21 among the dynamic device 24, the heat exchanger 4, the main heat dissipating device 22, and the liquid pump 23. In this state, the refrigerant in the refrigerant circulation pipeline 31 circulates in the cooling circulation direction.

The refrigerant in the refrigerant circulation pipeline 31 flows past the vehicle internal heat exchanging device 34, so as to dissipate heat from the same to thereby reduce the temperature in the vehicle. Hence, heat is transmitted from the vehicle internal heat exchanging device 34 into the surroundings through the vehicle external heat exchanging device 32.

The coolant in the dynamic coolant circulation pipeline 21 flows past the dynamic device 24 so as to dissipate heat from the same. The heat dissipated from the dynamic device 24 is received by the heat exchanging unit 4, and is transmitted into the surroundings through the main heat dissipating device 22.

Figure 4:
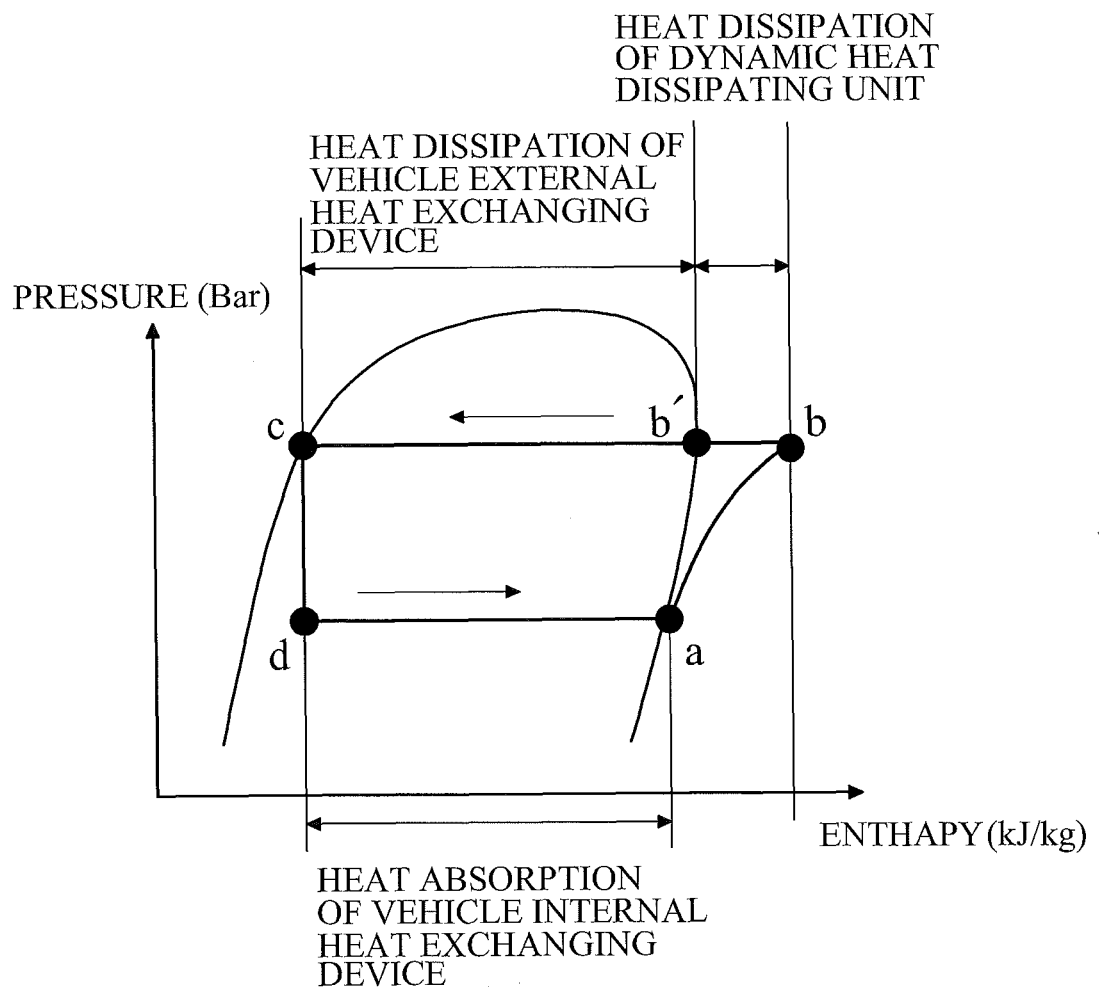
FIG. 4 is a Mollier chart illustrating a heat circulation curve during a cooling mode of an air conditioner unit of the first preferred embodiment.

FIG. 4 is a Mollier chart of the refrigerant used in this embodiment. In this chart, line a-b illustrates the compression process of the refrigerant, line b-b' illustrates the heat dissipating extent of the dynamic heat dissipating unit 2, line b'-c illustrates the heat dissipating ability of the vehicle external heat exchanging device 32, line c-d illustrates the pressure drop and throttle of the refrigerant, and line d-a illustrates the heat absorption ability of the vehicle internal exchanging device 34.

As shown in FIG. 4, by dissipating heat from the air conditioner unit 2 through the dynamic heat dissipating unit 2, the heat transfer loads of the air conditioner unit 3 and the vehicle external heat exchanging device 32 can be reduced, thereby allowing for a reduction in the volume of the vehicle external heat exchanging device 32.

Figure 5:
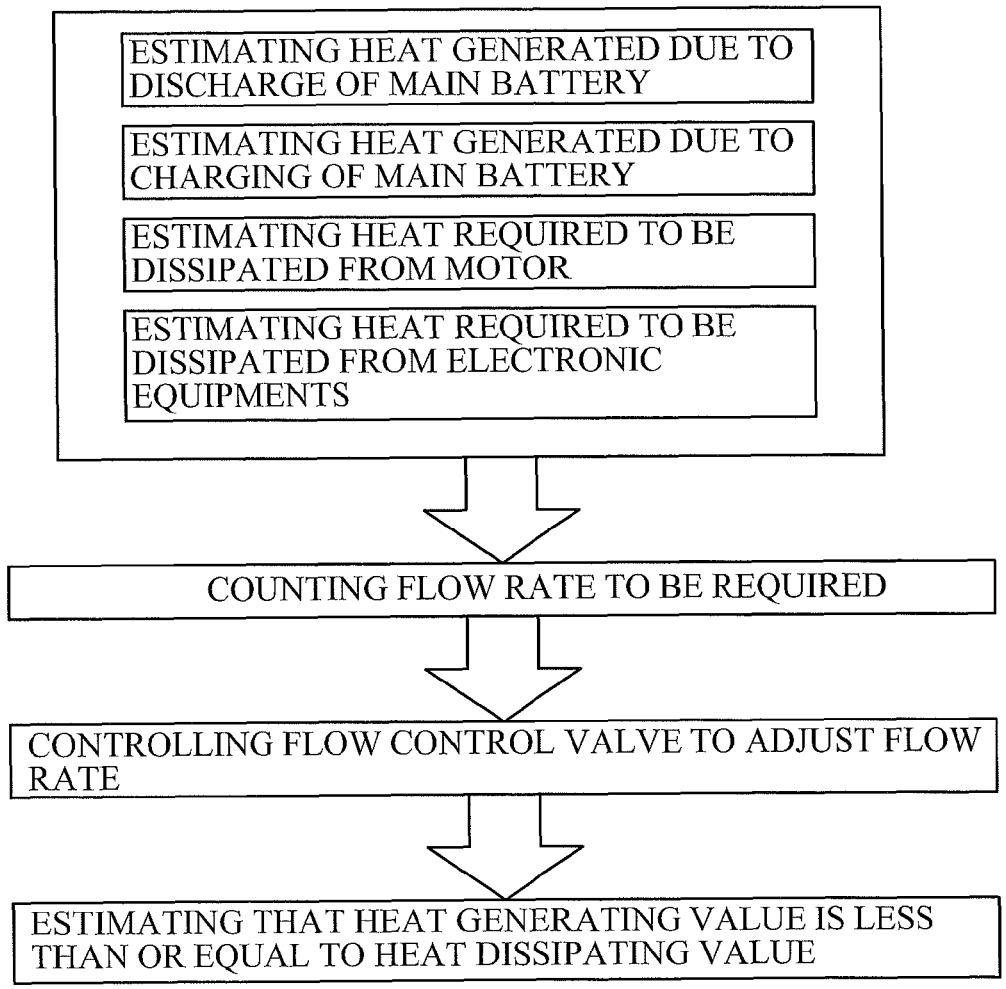
FIG. 5 is a schematic diagram illustrating a thermal management control of the first preferred embodiment.

With particular reference to FIGS. 3 and 5, by adjusting the flow rate of the coolant under control of the control unit 5, the thermal management control can be improved. The control unit 5 receives and processes the temperature signals emitted from the temperature sensors 27 to obtain an estimated heat generating value of the dynamic device 24 and a heat dissipating ability value of the main heat dissipating device 22. Since the heat dissipating ability value of the main heat dissipating device 22 is affected by the flow rate of the coolant, and is proportional to the flow rate under the same condition, the control unit 5 can adjust the flow rate of the coolant to allow the heat dissipating ability value of the main heat dissipating device 22 to meet the estimated heat generating value to be required, thereby reducing consumption of power, promoting utilization of power, and avoiding an increase in temperature due to poor heat dissipation.

Figure 6:
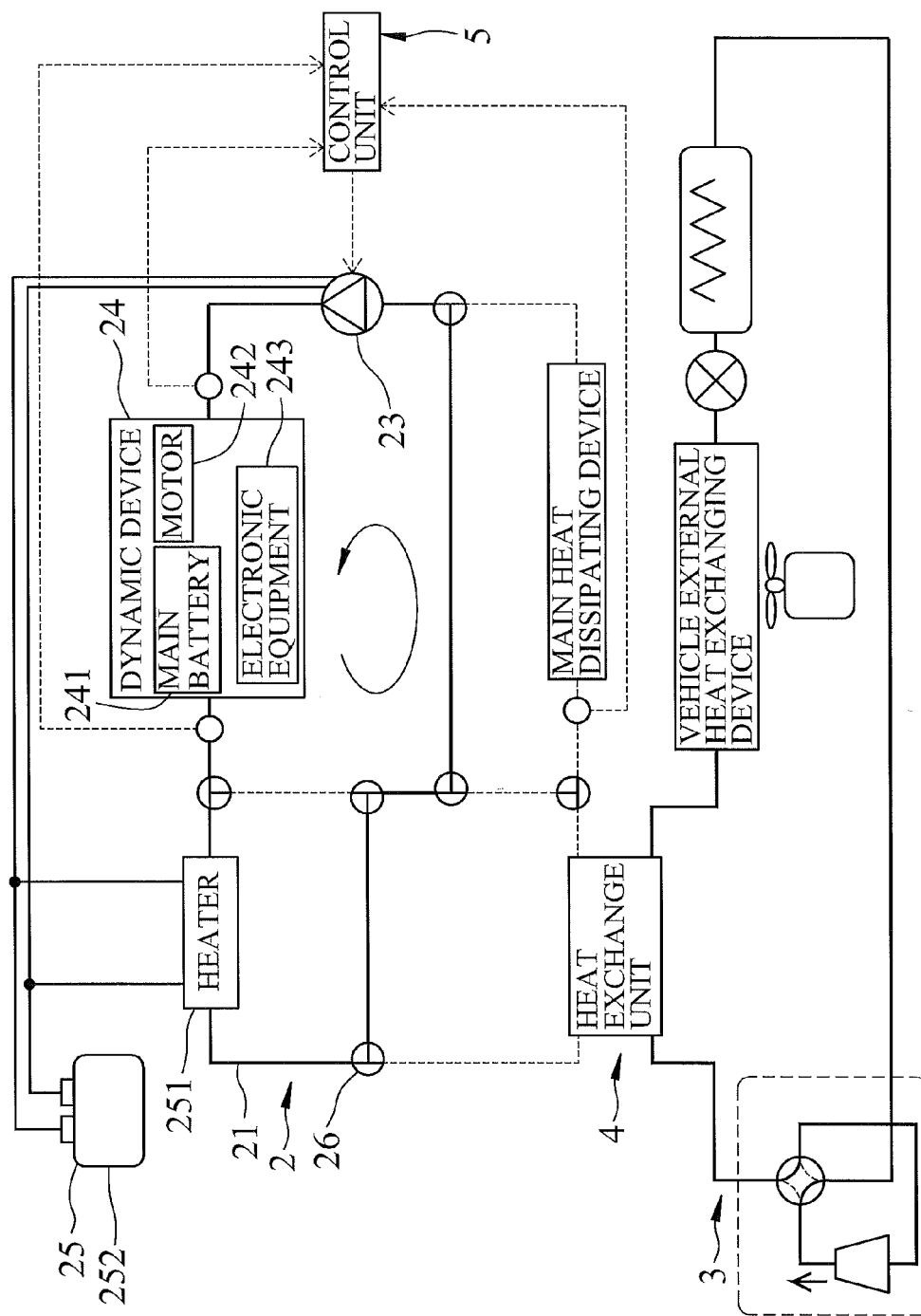
FIG. 6 is a schematic diagram of the first preferred embodiment, illustrating a start activation mode of the dynamic heat dissipating unit.

3. Start Activation Mode:

Referring to FIG. 6, when the surrounding temperature is less than a start temperature of the dynamic device 24 so that the main battery 241 of the dynamic device 24 cannot be activated or the motor 242 cannot be started, the dynamic heat dissipating unit 2 is switched to operate in the start activation mode. During this mode, the auxiliary heating device 25 is driven such that the spare battery 252 supplies electricity to the heater 251 and the liquid pump 23, and the auxiliary circulation device 26 is switched to allow the coolant to flow and circulate among the dynamic device 24, the heater 251, and the liquid pump 23.

The coolant in the dynamic coolant circulation pipeline 21 flows past the heater 251 so as to receive heat from the heater 251. The heat transmitted from the heater 251 is carried by the coolant into the dynamic device 24 to activate the main battery 241 and preheat the motor 241 and the electronic equipments 243. Upon activation of the main battery 241, the auxiliary heating device 25 is deactivated to increase the use efficiency of the spare battery 252.

It should be noted that, since the auxiliary heating device 25 is required for providing heat energy in cold seasons, and since the spare battery 252 needs to supply electricity to both the heater 251 and the liquid pump 23, in this embodiment, the spare battery 252 is a NIMH battery, which can supply electricity at a low temperature.

Figure 7:
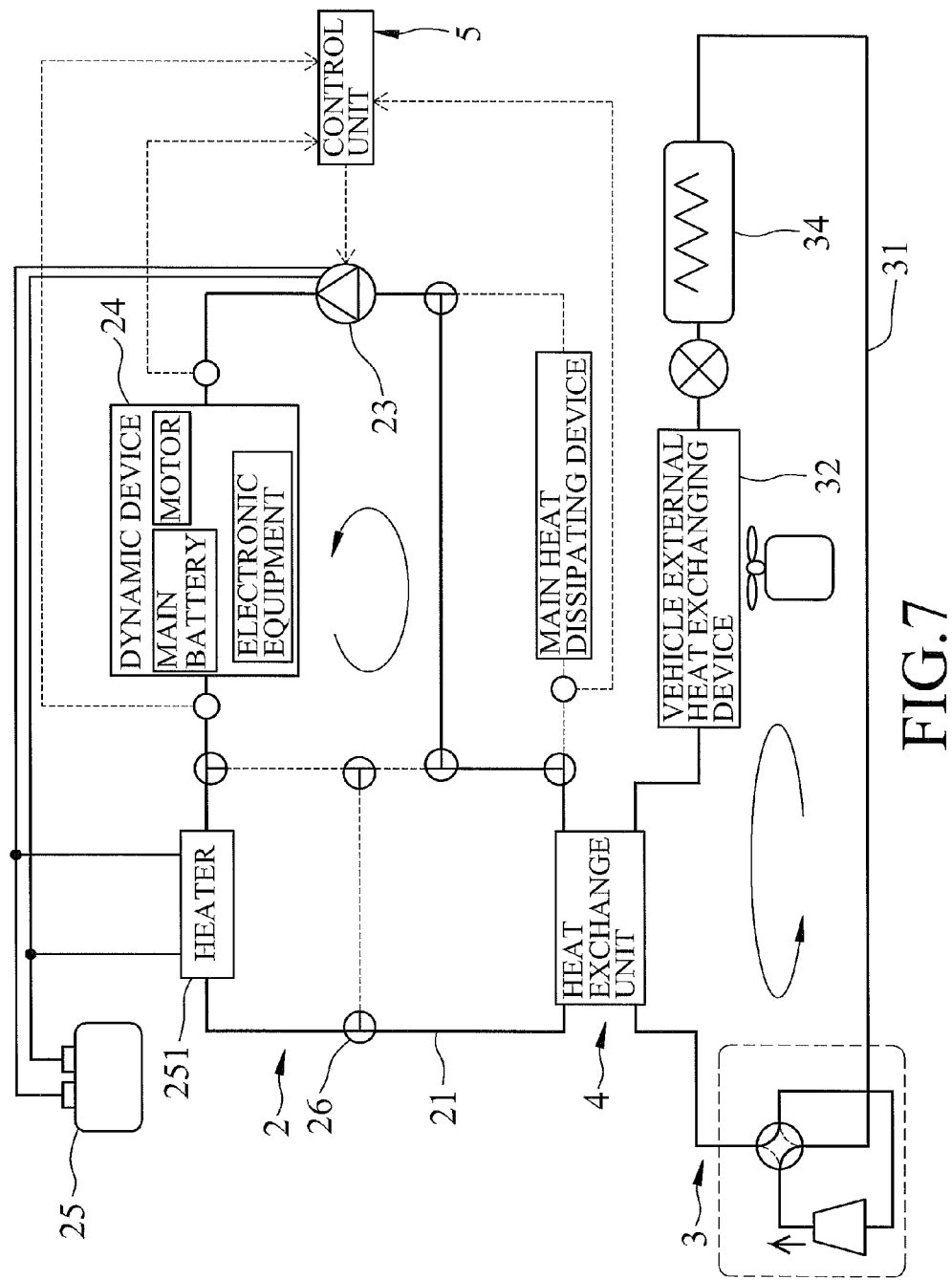
FIG. 7 is a schematic diagram of the first preferred embodiment, illustrating a dual heating mode of the dynamic heat dissipating unit.

4. Dual Heating Mode:

Referring to FIG. 7, when the weather is cold such that the system cannot work, the dynamic heat dissipating unit 2 is switched to operate in the dual heating mode. During this mode, the air conditioner 3 is opened, and operates in the heating mode, and the auxiliary heating device 25 provides heat energy to both the air conditioner unit 3 and the dynamic device 24 to promote the air heating function of the air conditioner unit 3. By switching the auxiliary circulation device 26, the coolant in the dynamic coolant circulation pipeline 21 flows and circulates among the dynamic device 24, the heater 251, the heat exchange unit 4, and the liquid pump 23. At this time, the refrigerant in the refrigerant circulation pipeline 31 circulates along the heating circulation direction.

The coolant in the dynamic coolant circulation pipeline 21 flows past the heater 251 so as to receive heat supplied by the same. The heat is transmitted from the heater 251 to the air conditioner unit 3 and the dynamic device 24 through the heat exchange unit 4, thereby allowing the dynamic device 24 to operate at a low temperature.

The refrigerant in the refrigerant circulation pipeline 31 flows past the vehicle external heat exchanging device 32 so as to receive heat energy from the surroundings, subsequently flows past the heat exchange unit 4 so as to receive heat energy supplied by the dynamic heat dissipating unit 2, and transmits heat energy to the vehicle internal heat exchanging device 34 for increasing the temperature in the vehicle (i.e., providing warm air into the vehicle).

Figure 8:
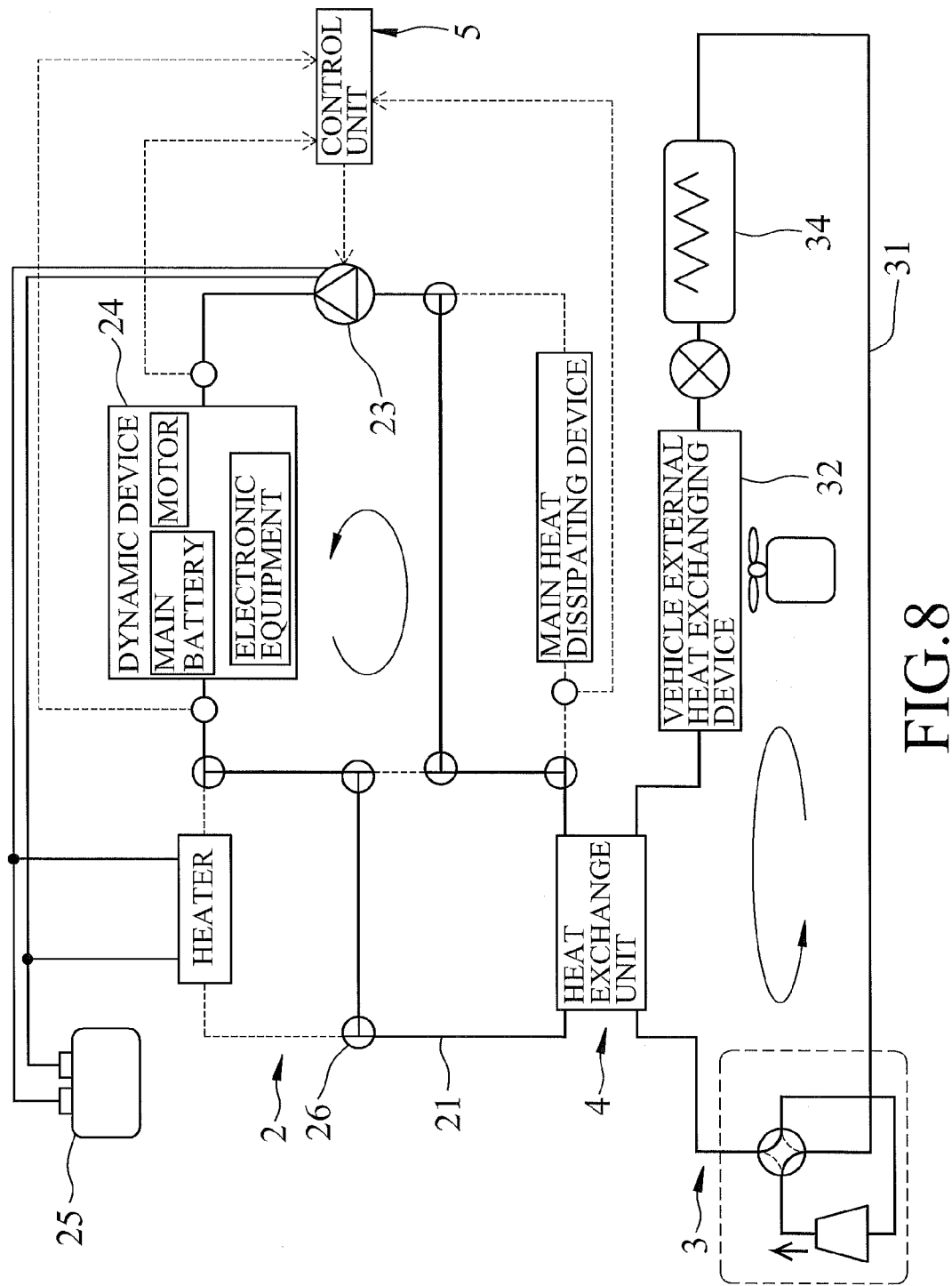
FIG. 8 is a schematic diagram of the first preferred embodiment, illustrating a heat recovering mode of the dynamic heat dissipating unit.

5. Heat Recovering Mode:

Referring to FIG. 8, in a situation where the surrounding temperature is low, while the system can operate normally, the dynamic heat dissipating unit 2 is switched to operate in the heat recovering mode. During this mode, the air conditioner unit 3 is opened, and operates in the heating mode. Heat energy generated by the dynamic device 24 is transmitted to the air conditioner unit 3 through the heat exchanger unit 4 so as to promote the air heating function of the air conditioner unit 3. By switching the auxiliary circulation device 26, the coolant in the dynamic coolant circulation pipeline 21 flows and circulates among the dynamic device 24, the heat exchange unit 4, and the liquid pump 23. At this time, the refrigerant in the refrigerant circulation pipeline 31 circulates along the heating circulation direction.

The coolant in the dynamic coolant circulation pipeline 21 flows past the dynamic device 24 so as to receive heat energy generated from the same. The heat energy is transmitted from the dynamic device 24 to the air conditioner unit 3 through the heat exchange unit 4.

The refrigerant in the refrigerant circulation pipeline 31 flows past the vehicle external heat exchanging device 32 so as to receive heat energy from the surroundings, subsequently flows past the heat exchange unit 4 so as to receive heat energy supplied by the dynamic heat dissipating unit 2, and transmits heat energy to the vehicle internal heat exchanging device 34 for increasing the temperature in the vehicle (i.e., providing heat into the vehicle).

Hence, heat dissipated from the dynamic device 24 can be recovered and transmitted to the air conditioner unit 3, thereby forming a heat recovery circulation to promote utilization of heat energy.

Figure 9:
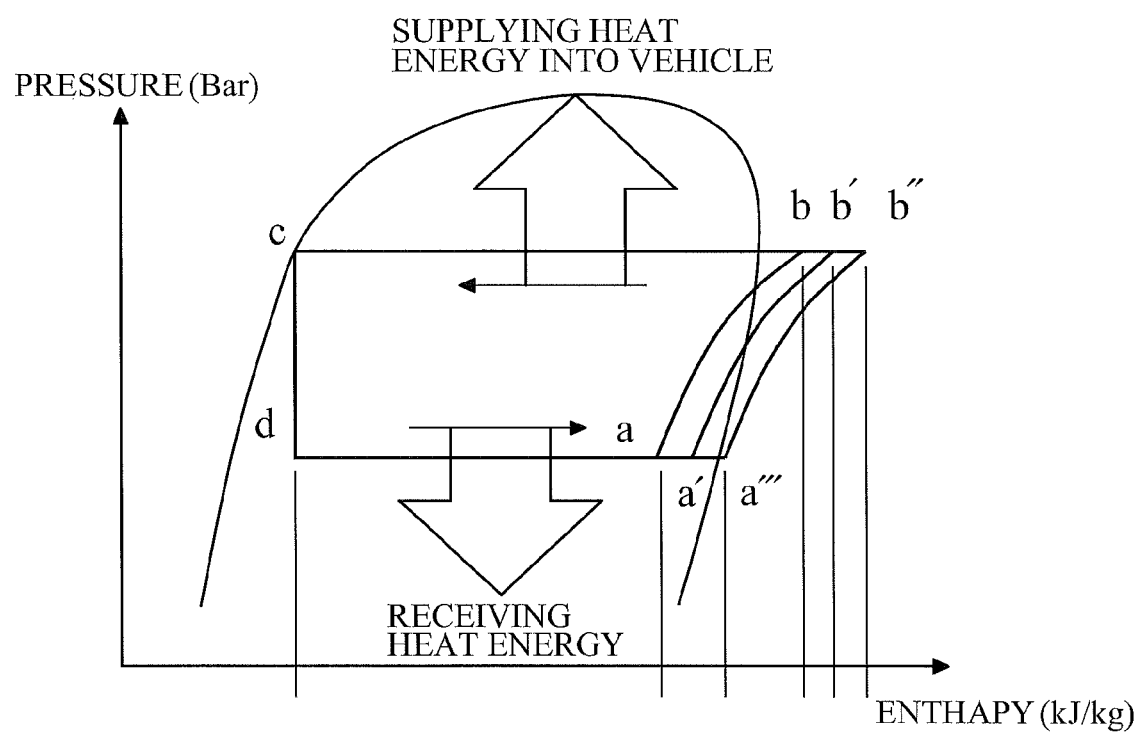
FIG. 9 is a Mollier chart illustrating a heat circulation curve during a heating mode of the air conditioner unit of the first preferred embodiment.

FIG. 9 is a Mollier chart of the refrigerant in this embodiment. In this chart, curve a-b-c-d illustrates a heat circulation of a conventional system that is not provided with the auxiliary heating device 25 and that cannot recover heat energy, curved a'-b'-c-d illustrates a heat circulation occurring during the heat recovery mode of the dynamic heat dissipating unit 2 in this embodiment, curve a"-b"-c-d illustrates a heat circulation occurring during the dual heating mode of the dynamic heat dissipating unit 2 in this embodiment, lines a-b, a'-b', and a"-b" illustrate refrigerant compression process, lines b-c, b'-c, b"-c illustrate transmission of heat energy from the vehicle internal heat exchanging device 34 into the vehicle, line c-d illustrates a refrigerant pressure drop process, and line d-a, d-a', and d-a" illustrate a process for receiving heat energy from the surroundings or the dynamic heat dissipating unit 2.

The longer each line d-a, d-a', d-a" is, the more the heat energy received is. The longer each line b-c, b'-c, b"-c is, the more the heat provided into the vehicle is. Form this chart, the heat energy received and provided into the vehicle by recovering heat energy of the dynamic device 24 and driving the auxiliary heating device 25 can be realized. That is, the air heating function of the air conditioner unit 3 is promoted.

With particular reference to FIG. 1, in view of the above, the thermal management system of this invention has the following advantages:

1. By switching the auxiliary circulation device 26 to change the circulation path of the coolant in the dynamic coolant circulation pipeline 21, and by providing a heat exchange path provided by the heat exchange unit 4, during the cooling mode of the air conditioner unit 3, the dynamic heat dissipating unit 2 can facilitate heat dissipation of the air conditioner unit 3 to reduce the load of the air conditioner unit 3 and, thus, the volume of the vehicle external heat exchanging device 32. During the heating mode of the air conditioner unit 3, heat dissipated from the dynamic device 24 is recovered such that, when the surrounding temperature is extremely low, the auxiliary heating device 25 can be driven to provide additional heat energy, so as to promote the use efficiency of the whole system. Furthermore, waste heat is recovered and reused to reduce energy consumption to thereby meet the environmental protection requirement.
2. The control unit 5 receives and processes the temperature signals emitted from the temperature sensors 27 to obtain the estimated heat generating value and the heat dissipating ability value when the vehicle runs. In this manner, energy utilization can be promoted, and an increase in the temperature due to poor heat dissipation can be avoided.
3. Due to the presence of the auxiliary heating device 25 and the spare battery 252, additional heat energy can be provided when the surrounding temperature is low, so as to allow for activation of the main battery 241 and start of the motor 242. Furthermore, when the surrounding temperature is extremely low, the auxiliary heating device 25 can supply heat energy to both the dynamic device 24 and the air conditioner unit 3 so as to allow the dynamic device 24 and the air conditioner unit 3 to operate at the extremely low temperature.

Figure 10:
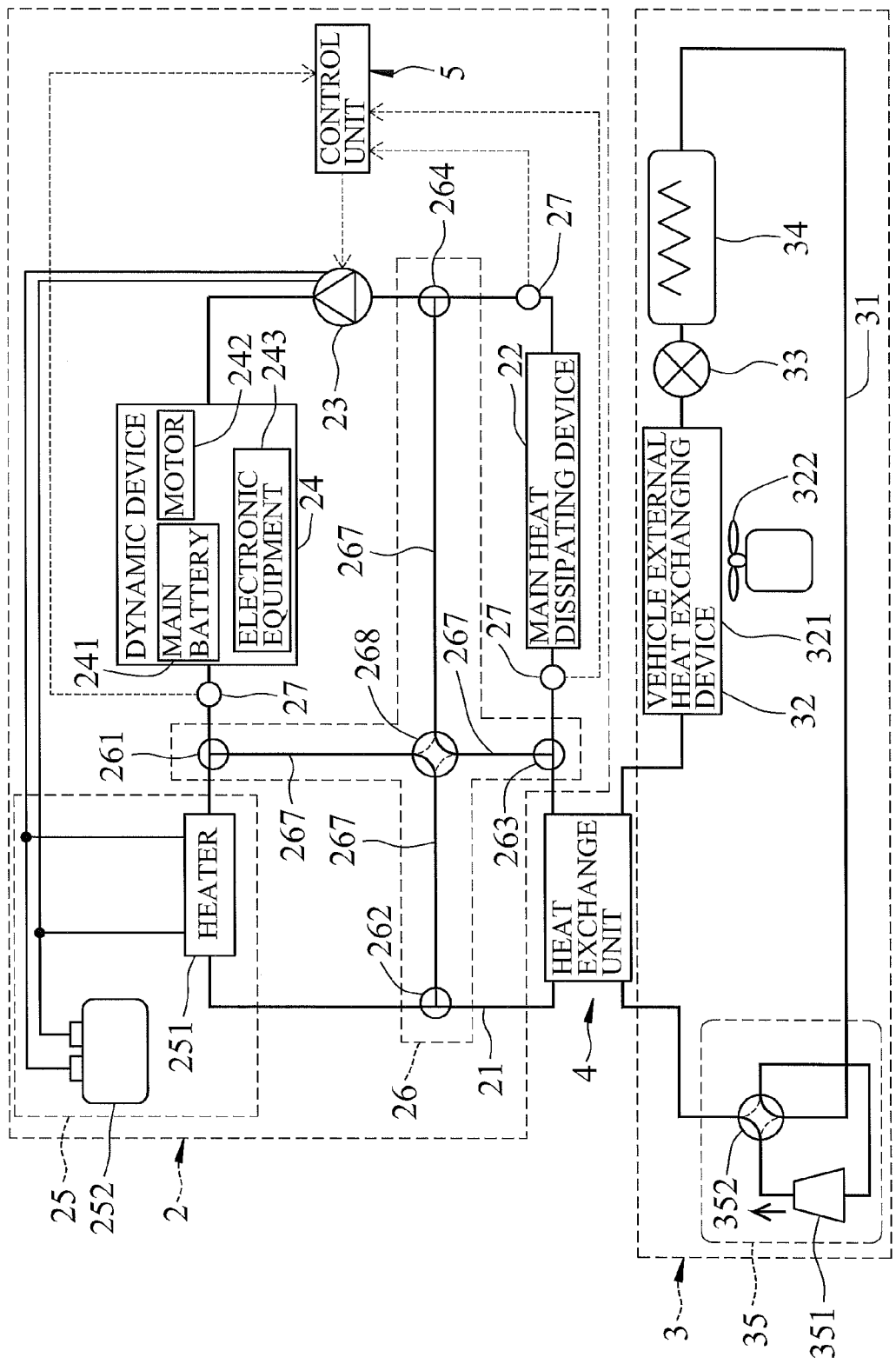
FIG. 10 is a schematic diagram illustrating a modification to the dynamic heat dissipating unit of the first preferred embodiment.

FIG. 10 shows a modified auxiliary circulation device 26 which further includes an auxiliary four-way valve 268 and four auxiliary pipes 267. The auxiliary four-way valve 268 is in fluid communication with the first, second, third, and fourth main three-way valves 261, 262, 263, 264 through the auxiliary pipes 267, respectively.

The temperature sensors 27 are used to measure respectively the temperatures of a coolant outlet of the dynamic device 24, and coolant inlet and outlet of the main heat dissipating device 22, and emits temperature signals to the control unit 5.

Figure 11:
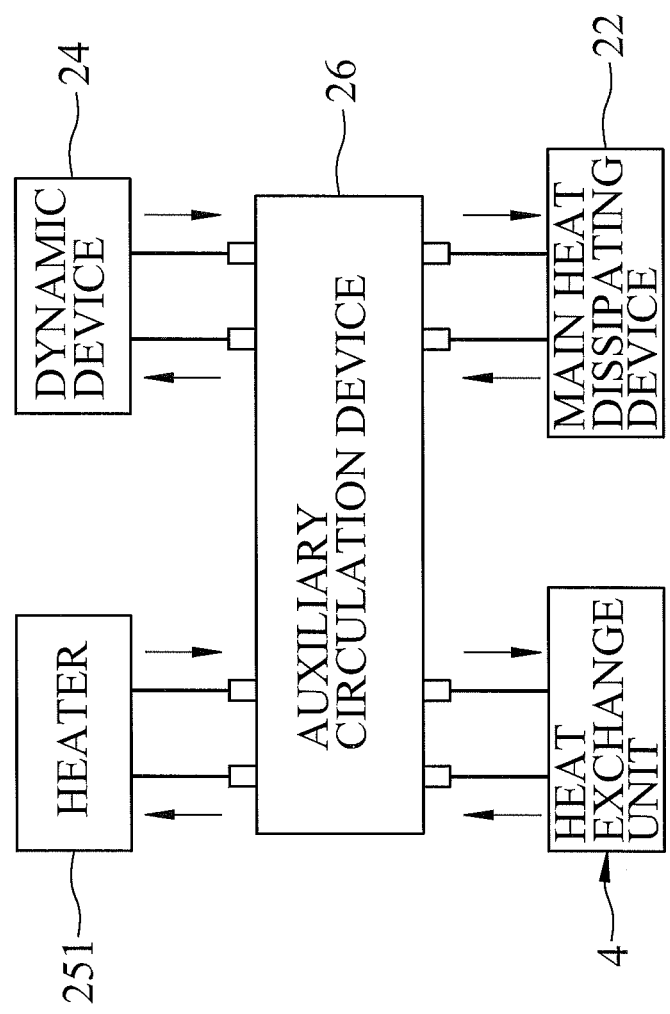
FIG. 11 is a schematic diagram illustrating an auxiliary circulation device of the first preferred embodiment.

It should be noted that, in actual use, the auxiliary circulation device 26 may be integrated with the liquid pump 23 and the control unit 5, as shown in FIG. 11, and is connected to the heater 251, the dynamic device 24, the main heat dissipating device 22, and the heat exchange unit 4, so as to increase convenience when constructing the system.

As such, the modified thermal management system can achieve the same object and effect of the first preferred embodiment.

Figure 12:
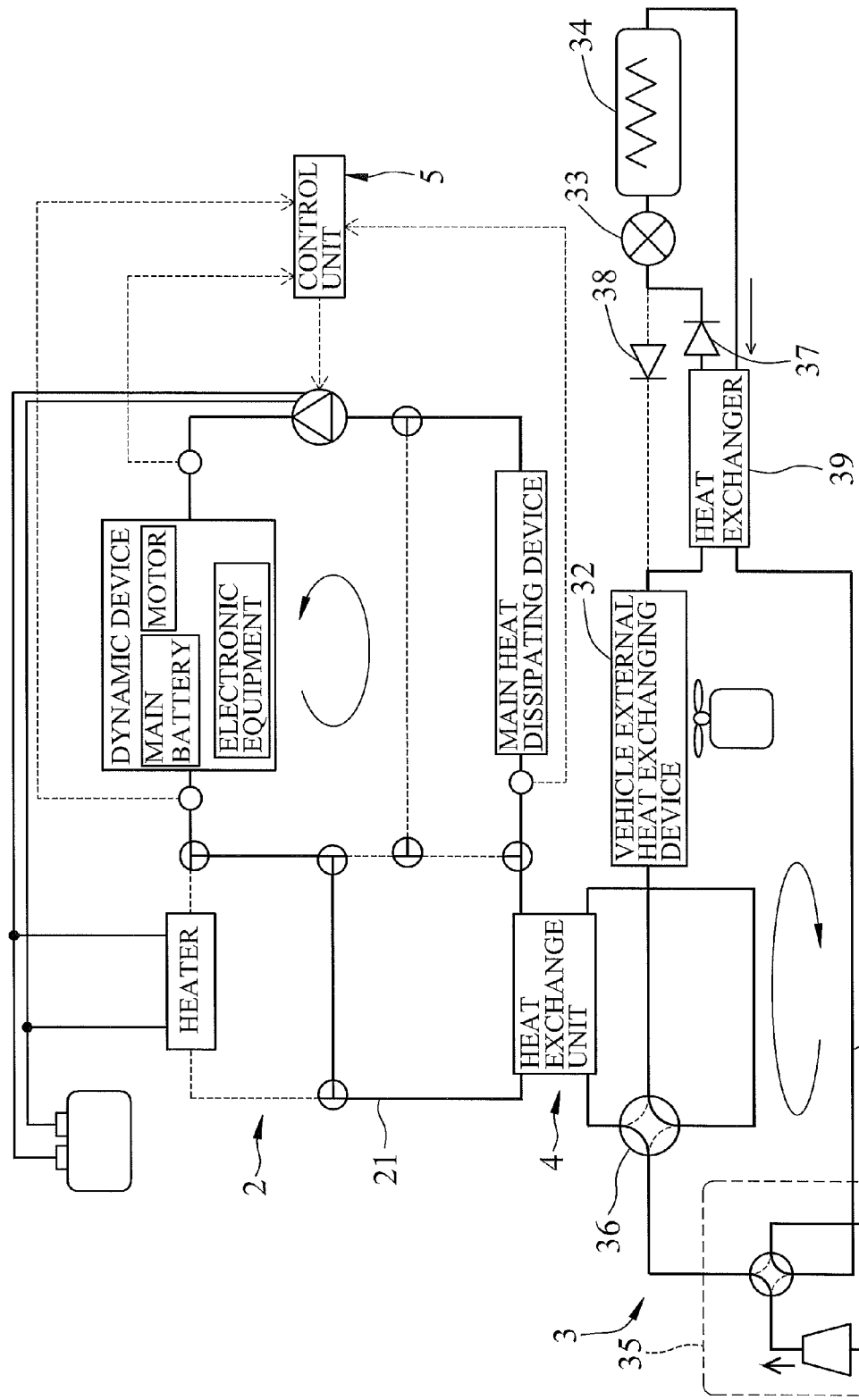
FIG. 12 is a schematic diagram of the second preferred embodiment of a thermal management system for an electric vehicle according to this invention.

FIG. 12 shows the second preferred embodiment of a thermal management system for an electric vehicle according to this invention, which is similar to the first preferred embodiment and which differs from the first preferred embodiment in the following.

The air conditioner unit 3 further includes a heat exchange four-way valve 36, a cooling mode check valve 37 connected between the expansion valve 33 and the vehicle external heat exchanging device 32 and allowing the coolant to flow therethrough in only the cooling circulation direction, a warm air check valve 38 connected between the expansion valve 33 and the vehicle internal heat exchanging device 34 and allowing the refrigerant to flow therethrough in only the heating circulation direction, and a heat exchanger 39.

The heat exchange four-way valve 36 is in fluid communication with two ends of the heat exchange unit 4, an end of the compressor device 35 connected to the heat exchange unit 4, and an end of the vehicle external heat exchanging device 32 connected to the heat exchange unit 4. As such, the heat exchange four-way valve 35 is operable to connect one end of the heat exchange unit 4 fluidly to a selected one of the compressor device 35 and the vehicle external heat exchanging device 32, and connect the other end of the heat exchange unit 4 fluidly to the other of the compressor device 35 and the vehicle external heat exchanging device 32, such that the flowing direction of the coolant in the heat exchange unit 4 is the same as that of the refrigerant in the heat exchange unit 4.

The heat exchanger 39 is disposed in the cooling circulation direction outlet of the vehicle external heat exchanging device 32 and the cooling circulation direction outlet of the vehicle internal heat exchanging device 34, such that heat is transferred from the vehicle external heat exchanging device 32 to the vehicle internal heat exchanging device 34.

Figure 13:
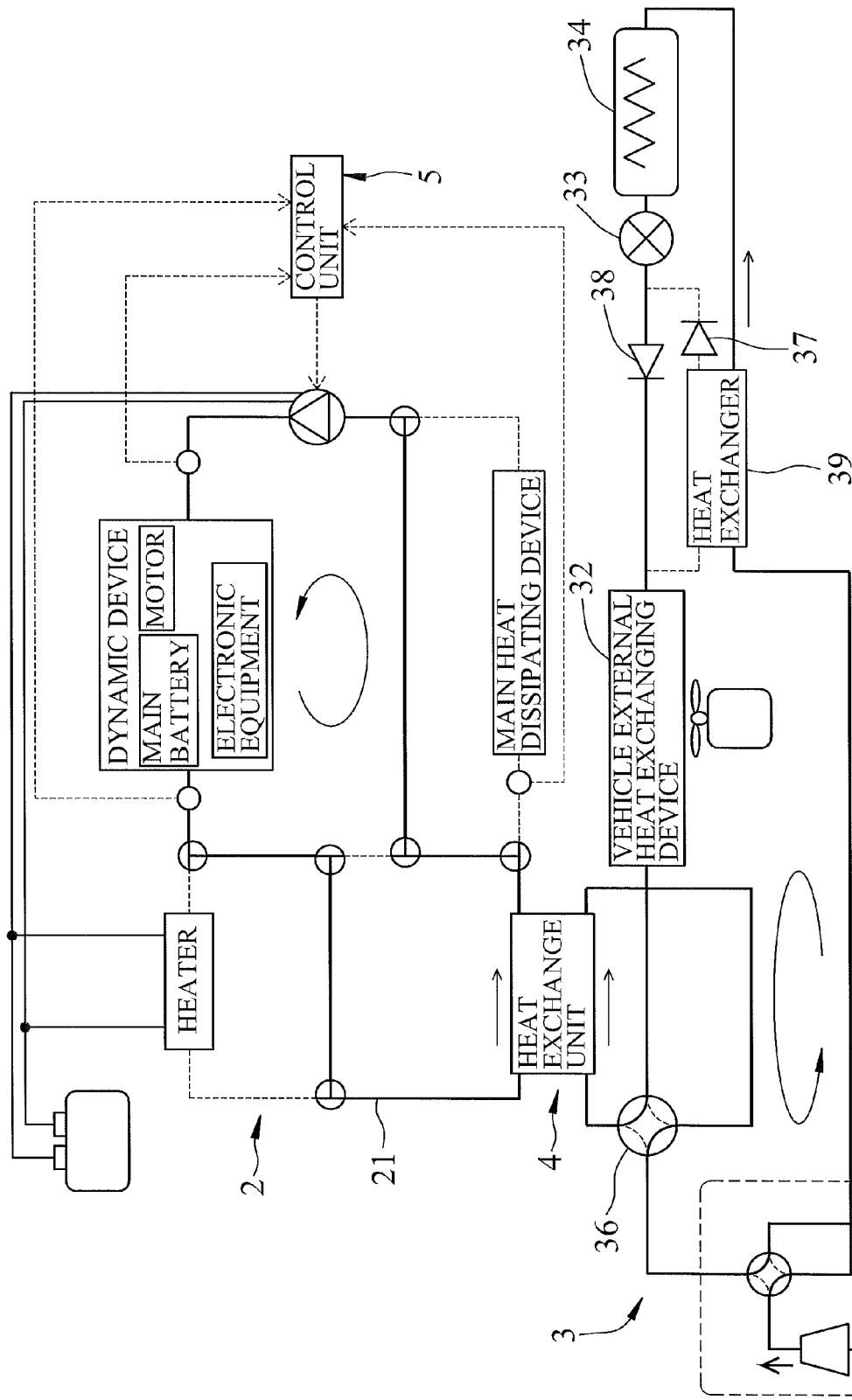
FIG. 13 is a schematic diagram of the second preferred embodiment, illustrating operation of a heat exchange four-way valve.

FIG. 13 illustrates that the air conditioner unit 3 operates in the heating mode. During the heating mode, the refrigerant flows through the heating mode check valve 38, and does not flow through the heat exchanger 39. Since the operation principle of this embodiment is similar to that of the first embodiment, a further description thereof is omitted.

Figure 14:
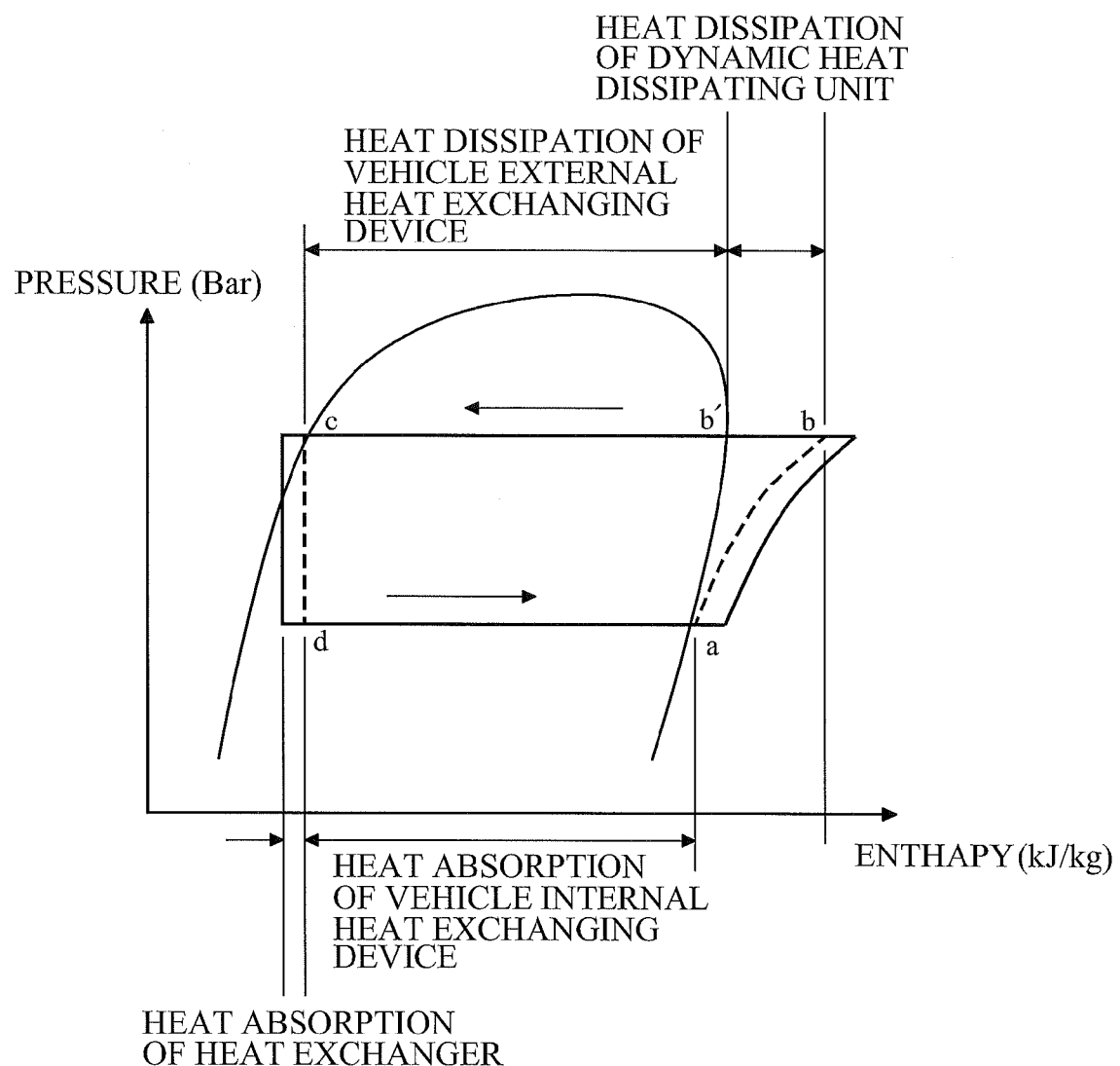
FIG. 14 is a Mollier chart illustrating function of the heat exchange four-way valve of the second preferred embodiment.

FIG. 14 is a Mollier chart of the refrigerant in this embodiment. In this chart, the phantom lines a-b and c-d illustrate respectively the refrigerant compression process and the refrigerant pressure drop and throttle process when the heat exchanger 39 is not used, and the solid lines a-b and c-d illustrate respectively the refrigerant compression process and the coolant pressure drop and throttle process when the exchanger 39 is used. The heat exchanger 39 provides an additional heat exchanging process for reducing the temperature of the refrigerant flowing from the vehicle external heat exchanging device 32, as shown by the solid line c-d, and for increasing the temperature of the refrigerant flowing from the vehicle internal heat exchanging device 34, as shown by the solid line a-b. As such, due to the addition of the heat exchanger 39, the length of the line d-a is increased. That is, the cooling effect is promoted.

Hence, the second preferred embodiment can achieve the same object and effect as the first preferred embodiment, and has the following additional advantages:
1. Due to the presence of the heat exchange four-way valve 36, in the heat exchange unit 4, the flowing direction of the coolant in the dynamic coolant circulation pipeline 21 can be controlled to be the same as that of the refrigerant in the refrigerant circulation pipeline 31, so that the heat exchanging effect of the heat exchange unit 4 provided during the cooling mode of the air conditioner unit 3 is the same as that provided during the heating mode of the air conditioner unit 3. Furthermore, when the heat exchange valve 36 malfunctions, although the performance of the system can be reduced, the system or the user cannot be damaged, thereby ensuring safety during use.
2. Since the heat exchanger 39 is disposed in the cooling circulation direction outlets of the vehicle external heat exchanging device 32 and the vehicle internal heat exchanging device 34, an additional heat exchange process can be provided to further reduce the temperature of the refrigerant flowing from the vehicle external heat exchanging device 32 to thereby promote the cooling effect of the air conditioner unit 3 and, thus, the operating efficiency of the system.

In view of the above, this embodiment is capable of promoting the heat energy utilization of the system, recovering waste heat to reduce power consumption, improving heat energy control, operating normally at an extremely low temperature, and enhancing safety during use. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:

1. A thermal management system adapted for use in an electric vehicle, said thermal management system comprising:
   a dynamic heat dissipating unit including a dynamic coolant circulation pipeline adapted for permitting a coolant to flow and circulate therein along a coolant circulation direction, a main heat dissipating device connected to said dynamic coolant circulation pipeline, a liquid pump connected to said dynamic coolant circulation pipeline and disposed downstream of said main heat dissipating device along the coolant circulation direction, and a dynamic device connected to said dynamic coolant circulation pipeline and disposed downstream of said liquid pump along the coolant circulation direction, said main heat dissipating device being adapted for dissipating heat from the coolant flowing therethrough, said liquid pump controlling a flow rate of the coolant flowing therethrough, said dynamic device being adapted to generate a power and heat;
   an air conditioner unit convertible between a cooling mode and a heating mode and including a refrigerant circulation pipeline adapted for permitting a refrigerant to circulate therein in a selected one of a cooling circulation direction and a heating circulation direction that are opposite to each other, a vehicle external heat exchanging device connected to said refrigerant circulation pipeline, an expansion valve connected to said refrigerant circulation pipeline and disposed downstream of said vehicle external heat exchanging device along the cooling circulation direction, a vehicle internal heat exchanging device connected to said refrigerant circulation pipeline and disposed downstream of said expansion valve along the cooling circulation direction, and a compressor device connected to said refrigerant circulation pipeline and disposed downstream of said vehicle internal heat exchanging device along the cooling circulation direction, the refrigerant circulating along the cooling circulation direction during the cooling mode of said air conditioner unit, and along the heating circulation direction during the heating mode of said air conditioner unit;
   a heat exchange unit connected to said dynamic coolant circulation pipeline and said refrigerant circulation pipeline and disposed in a coolant inlet of said main heat dissipating device of said dynamic heat dissipating unit and a cooling circulation direction outlet of said compressor device of said air conditioner unit such that, during the cooling mode of said air conditioner unit, heat is transmitted from said air conditioner unit to said dynamic heat dissipating unit, and is dissipated through said main heat dissipating device; and
   a control unit electrically connected to said liquid pump and emitting a control signal to said liquid pump, so that said liquid pump is operable to adjust the flow rate of the coolant flowing therethrough in accordance with the control signal.

2. The thermal management system as claimed in claim 1, wherein said heat exchange unit is disposed in a heating circulation direction inlet of said compressor device of said air conditioner unit so as to receive heat from said dynamic heat dissipating unit during the heating mode of said air conditioner unit.

3. The thermal management system as claimed in claim 2, wherein said dynamic heat dissipating unit further includes an auxiliary heating device, said auxiliary heating device including a heater connected to said dynamic coolant circulation pipeline and located between said heat exchange unit and said dynamic device, and a spare battery electrically connected to said heater and said liquid pump.

4. The thermal management system as claimed in claim 3, wherein said dynamic heat dissipating unit further includes an auxiliary circulation device connected to said dynamic coolant circulation pipeline, said auxiliary circulation device being in fluid communication with a juncture between said dynamic device and said heater, a juncture between said heater and said heat exchange unit, a juncture between said heat exchange unit and said main heat dissipating device, and a juncture between said main heat dissipating device and said liquid pump, said auxiliary circulation device being operable to change a circulation path of the coolant among five operating modes including a dynamic heat dissipating mode, a heat dissipation assisting mode, a start activation mode, a dual heating mode, and a heat recovering mode.

5. The thermal management system as claimed in claim 4, wherein"
   when said dynamic heat dissipating unit is in the dynamic heat dissipating mode, the coolant circulating among said dynamic device, said main heat dissipating device, and said liquid pump;

when said dynamic heat dissipating unit is in the heat dissipation assisting mode, the coolant circulating among said dynamic device, said heat exchange unit, said main heat dissipating device, and said liquid pump;

when said dynamic heat dissipating unit is in the start activation mode, the coolant circulating among said dynamic device, said heater, and said liquid pump;

when said dynamic heat dissipating unit is in the dual heating mode, the coolant circulating among said dynamic device, said heater, said heat exchange unit, and said liquid pump; and when said dynamic heat dissipating unit is in the heat recovering mode, the coolant circulating among said dynamic device, said heat exchange unit, and said liquid pump.

6. The thermal management system as claimed in claim 5, wherein, when the surrounding temperature is less than a start temperature of said dynamic device, said dynamic heat dissipating unit is switched to operate in the start activation mode, and said spare battery supplies electricity to said heater and said liquid pump.

7. The thermal management system as claimed in claim 5, wherein said auxiliary circulation device includes a first main three-way valve, a second main three-way valve, a third main three-way valve, and a fourth main three-way valve, said first main three-way valve being disposed between said dynamic device and said heater, said second main three-way valve being disposed between said heater and said heat exchange unit, said third main three-way valve being disposed between said heat exchange unit and said main heat dissipating device, said fourth main three-way valve being disposed between said main heat dissipating device and said liquid pump, said auxiliary circulation device further including a first auxiliary three-way valve, a second auxiliary three-way valve, and five auxiliary pipes, said first auxiliary three-way valve being in fluid communication with said first and second main three-way valves via two of said auxiliary pipes, respectively, said second auxiliary three-way valve being in fluid communication with said first auxiliary three-way valve and said third and fourth main three-way valves via the remaining auxiliary pipes, respectively.

8. The thermal management system as claimed in claim 4, wherein said auxiliary circulation device includes a first main three-way valve, a second main three-way valve, a third main three-way valve, and a fourth main three-way valve, said first main three-way valve being disposed between said dynamic device and said heater, said second main three-way valve being disposed between said heater and said heat exchange unit, said third main three-way valve being disposed between said heat exchange unit sand said main heat dissipating device, said fourth main three-way valve being disposed between said main heat dissipating device and said liquid pump, said auxiliary circulation device further including an auxiliary four-way valve and four auxiliary pipes, said auxiliary four-way valve being in fluid communication with said first, second, third, and fourth main three-way valves through the auxiliary pipes, respectively.

9. The thermal management system as claimed in claim 2, wherein said air conditioner unit further includes a heat exchange four-way valve that is in fluid communication with two ends of said heat exchange unit, an end of said compressor device connected to said heat exchange unit, and an end of said vehicle external heat exchanging device connected to said heat exchange unit, said heat exchange four-way valve being operable to connect one of said two ends of said heat exchange unit to a selected one of said compressor device and said vehicle external heat exchanging device, and connect the other of said two ends of said heat exchange unit to the other of said compressor device and said vehicle external heat exchanging device, such that a flowing direction of the coolant in said heat exchange unit is the same as that of the refrigerant in said heat exchange unit.

10. The thermal management system as claimed in claim 2, wherein said air conditioner unit further includes a heat exchanger, which is disposed in a cool air circulation direction outlet of said vehicle external heat exchanging device and a cooling circulation direction outlet of said vehicle internal heat exchanging device, such that heat is transferred from said vehicle external heat exchanging device to said vehicle internal heat exchanging device.

11. The thermal management system as claimed in claim 2, wherein:
said dynamic heat dissipating unit further includes three temperature sensors that are disposed for measuring respectively temperatures of coolant inlet and outlet of said dynamic device and a coolant inlet of said main heat dissipating device to emit temperature signals to said control unit; and said control unit receives and processes the temperature signals to obtain an estimated heat generating value and a heat dissipating ability value of said main heat dissipating device such that, when the estimated heat generating value is greater than the heat dissipating ability value, said control unit emits a corresponding control signal to said liquid pump 23 so that said liquid pump is operated to increase the flow rate until the estimated heat generating value is equal to or smaller than the heat dissipating ability value.

\* \* \* \* \*